M. KROKAVETZ.
ELECTRIC CLIP.
APPLICATION FILED MAY 16, 1921.

1,432,343. Patented Oct. 17, 1922.

INVENTOR
M. Krokavetz
BY John A. Bommhardt
ATT'Y

Patented Oct. 17, 1922.

1,432,343

UNITED STATES PATENT OFFICE.

MARTIN KROKAVETZ, OF CLEVELAND, OHIO.

ELECTRIC CLIP.

Application filed May 16, 1921. Serial No. 469,874.

*To all whom it may concern:*

Be it known that I, MARTIN KROKAVETZ, a citizen of the United States, residing at Cleveland, in the county of Cuyahoga and State of Ohio, have invented certain new and useful Improvements in Electric Clips, of which the following is a specification.

This invention relates to clips or attaching devices for connecting electric wires, and will be found useful in connection with testing instruments, as well as in various other relations where it may be desirable to temporarily make a connection between or to electric wires.

Figure 1:
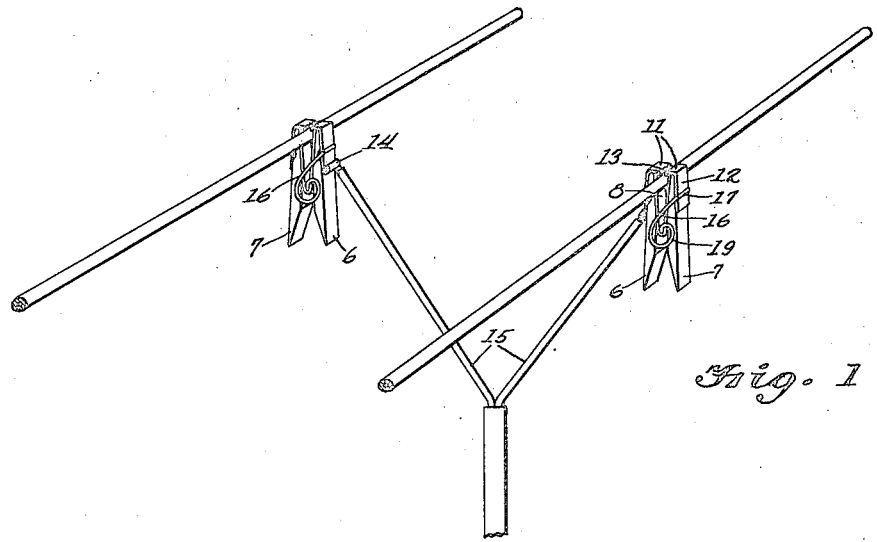
Figure 2:
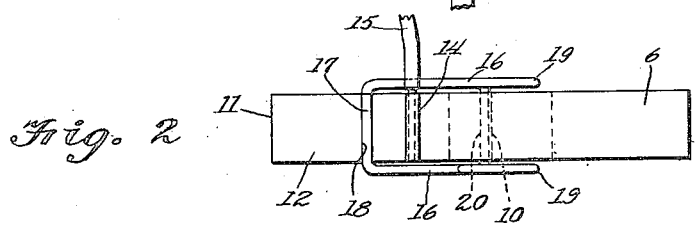
Figure 3:
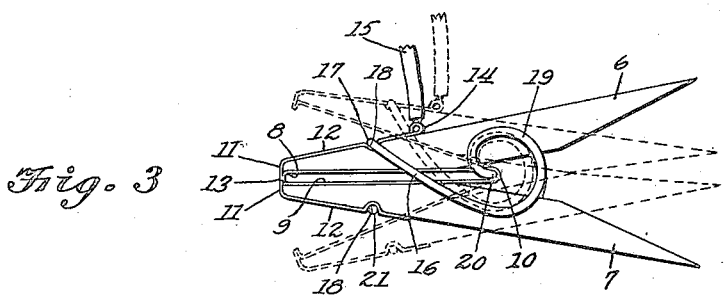

The object of the invention is to provide an improved and simple device of the kind, a feature of which is that the main part of the clamp members is made of wood or other insulating material, which members are faced and connected by a bent metal sheet which serves as the conductor and to which a branch wire may be attached. The details of the device will appear from the following description and the accompanying drawings in which Fig. 1 is a perspective view illustrating one application of the device. Fig. 2 is a plan of the clip. Fig. 3 is a side elevation thereof.

The clip consists of two members 6 and 7, and these members are preferably made of wood impregnated with kerosene and then shellacked or varnished, forming insulated members which are weather and acid proof. Associated with these members is a strip of metal bent to form two opposite portions 8 and 9 which extend along the jaw faces of the members 6 and 7 and which are connected by a bend or loop 10, which forms what may be called the hinge or pivotal joint between the members. The ends of the strip are then bent around the front ends of the members as shown at 11 and extend thence backwardly along the outer side of the jaws as shown at 12, offset edges 13 being formed or crimped in the sheet at the point of the jaws. The strip may be fastened to the wooden members in any suitable way, and one end of the strip is curled as indicated at 14 to receive the end of a branch wire 15.

The jaws are pressed together by a spring 16 which has the form of a finger at 17 extending across in a groove 18 formed in the back of one of the jaws, and in the metal covering thereon, and this finger projects from one end of a coil 19 which is duplicated at the opposite side, the coils being connected by a cross bar 20 which is seated in or against the bend 10 in the metal covering, whereby the spring is retained in place, and will tend to hold the jaws in closed position. The opposite end of the spring terminates in a finger 21 seated in a similar notch 18 in the other jaw.

The wire connections are preferably soldered to the clip, to avoid the use of screws or the like which give a poor contact and are liable to corrosion if exposed to acids. The metal strip forming the facings 8 and 9 is preferably coated with antimony to resist acids and fumes.

It will be noted that the strip with which the jaws are coated forms the connection for the current, which flows through the same instead of through the insulated handle members.

In use the clips may be applied to wires by pressing the handles together as illustrated in dotted lines in Fig. 3, and then applied to the wires, and the current will then flow from the wire through the metal strip covering or facing of the jaws and to the branch wire and instrument to be attached.

I claim:

1. An electric clip comprising a pair of insulated jaws, and a strip of conducting material attached to the jaws and bent to form a connecting loop between the jaws, said strip being provided with means for attachment of a conductor thereto.

2. An electric clip comprising a pair of insulated jaws, a strip of conducting material covering the faces and front ends of the jaws, and bent to form a loop between the jaws, and a spring tending to press the jaws together.

3. An electric clip comprising a pair of insulated jaws, a strip of conducting material covering the faces and turned ends of the jaws, and bent to form a loop between the jaws, and a spring tending to press the jaws together, said spring comprising a piece of wire having a cross bar engaged in said loop.

4. An electric clip comprising a pair of insulated jaws, a strip of conducting material covering the faces and turned ends of the jaws, and bent to form a loop between the jaws, and a spring tending to press the jaws together, said spring comprising a piece of wire bent to form coils at opposite sides of the jaws, and a cross bar connecting said coils and extending through the loop.

5. An electric clip comprising a pair of wooden jaws, a spring tending to close the jaws, and a strip of conducting material covering the faces and ends of the jaws and forming a pivotal connection between the jaws, and having means on the outer sides of the jaws for attachment of a wire thereto.

In testimony whereof, I affix my signature in presence of two witnesses.

MARTIN KROKAVETZ.

Witnesses:
JOHN A. BOMMHARDT,
BESSIE F. POLLAK.